May 15, 1962 G. E. BRACKETT 3,034,677
METER ENCLOSURE
Filed April 21, 1960

Inventor
George E. Brackett
by Roberts, Cushman & Grover
Att'ys

United States Patent Office 3,034,677
Patented May 15, 1962

3,034,677
METER ENCLOSURE
George Edward Brackett, Candia, N.H., assignor to Basic Products Corporation, West Milwaukee, Wis., a corporation of Wisconsin
Filed Apr. 21, 1960, Ser. No. 23,789
1 Claim. (Cl. 220—3.8)

This invention relates to meter enclosures for receiving detachable meters and more particularly to such enclosures as may be opened when the meter has been removed therefrom.

Such enclosures are provided with a removable cover including an aperture through which projects a substantial portion of the meter housing and which is substantially filled thereby. Normally the enclosure will be first closed and then the meter will be inserted through the aperture, blade contacts at the back of the meter engaging a jaw socket within the enclosure. The meter may then be sealed at the edges of the aperture so that the meter may not be removed without disturbing the seal. It is desirable that the cover of the box be easily removable for such purposes as making connections and meter testing but that the means for opening the enclosure should be inaccessible when the meter is finally sealed, so that no more than one seal is needed for the meter and enclosure together.

Thus objects of the present invention are to provide a means for securing the cover of such an enclosure so that it may be easily and quickly removed when the meter has first been withdrawn while preventing such removal when the meter is in place.

Accordingly the present invention contemplates an enclosure comprising an open-faced box and a cover wherein the means for the attachment of said cover engage upon a single vertical motion and a latch within the box prevents any subsequent vertical movement. Once the meter is attached, the disengagement of the cover is prevented by the meter itself, even though the latch should fail.

According to this invention the meter housing comprises a box having an open front and a depending flange at the top of the front, a cover for said front, the upper edge of the cover fitting under said flange, the cover having a meter opening and means for latching the cover to the box, the cover being closable by first applying it to said open front below said flange and then imparting upward movement to bring said upper edge behind the flange, said latching means being lockable in response to said movement. Preferably the latching means has a handle accessible through said opening for unlatching the cover. In the preferred embodiment the latching means is located at one side of the box and interlocking means is located at the bottom of the box to hold the bottom of the cover against the box, the interlocking means comprising parts on the box and cover respectively which interlock in response to said movement.

For the purpose of illustration typical embodiments of the present invention are shown in the accompanying drawings in which FIG. 1 is a partially broken away plan view of a meter box;

Figure 1:
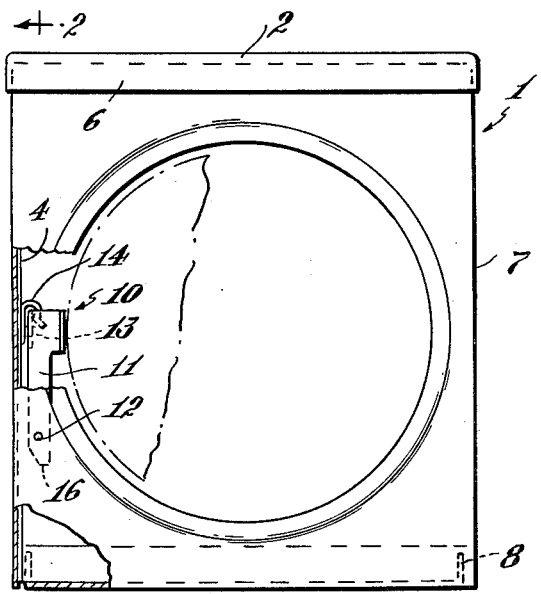
Figure 2:
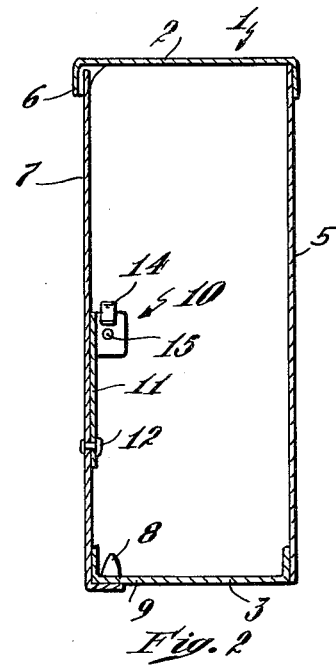
FIG. 2 is a section on line 2—2 of FIG. 1.

Referring to FIGS. 1 and 2 the box 1 comprises a top wall 2, a bottom 3, two side walls 4, and a back wall 5. A flange 6 projects downwardly from the top wall 2 beyond the side walls 4 and over the open face of the box. The top edge of the cover 7 fits beneath the flange 6. The bottom edge of the cover 7 includes hooks 8 which are arranged so as to engage corresponding openings 9 in the bottom 3 of the box 1 from the outside.

With this arrangement both the top and the bottom of the cover 7 are secured by the same upward movement. A latch 10 prevents any relative vertical motion of the box 1 and cover 7 when engaged. The latch 10 comprises a lever 11, pivotally attached to the cover 7, and a spring 14 rigidly attached to the side wall 4 of the box 1. As the cover 7 is brought to its closed position the lever 11 rides up over a pin 15 until the pin is opposite a corresponding aperture in the lever 11 at which point the spring 14 forces the lever 11 over the pin 15 closing the latch. As the latch 10 may only be released from within the enclosure only one seal is needed for the meter and enclosure together, that being to seal the meter to the cover 7.

The projection 16 of the lever 11 beyond the pivot 12 limits the swing of the lever 11 by striking the inside of the box.

Figure 3:
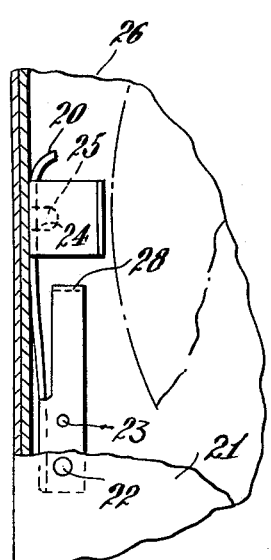
FIG. 3 is a partially broken away view of a latch.

FIG. 3 depicts another form of latch wherein a lever 20 is constructed of resilient sheet material and is rigidly attached at one end to the cover by the rivet 22 and the pin 23. An aperture 24 in the free end of the lever engages a pin 25, rigidly attached to the box 26, so as to prevent any vertical motion of the cover 21 relative to box 26. An extension 28 of the material of the lever 20 is bent back so as to form a stop to limit the travel of the operating portion of the lever.

Figure 4:
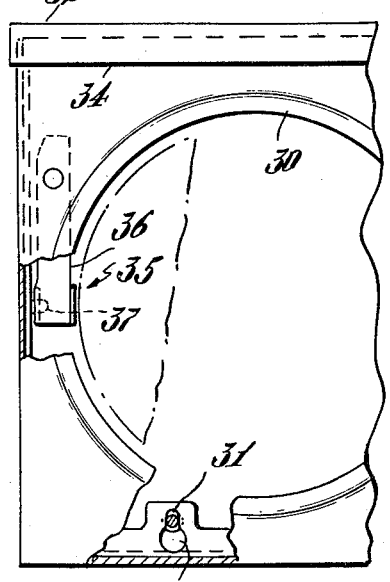
FIG. 4 is a partially broken away plan view of a modification.

FIG. 4 depicts a further embodiment wherein the bottom of the cover 30 is held by a headed pin 31 which is rigidly attached to the cover 30 and which engages a keyhole slot 33 in the box 32. Again the top of the cover 30 is held by a flange 34 so that both the top and the bottom of the cover 30 are secured by a single upwards motion. In this embodiment the latch 35 is not spring loaded and the lever 36 is placed in engagement with the pin 37 by hand.

Throughout this specification and in the claims, whenever terms indicating orientation, such as top, back, and vertical, are used, it should be understood that these terms are used as conveniences in description and illustration only and that the invention may be used in any position.

It should further be understood that the present disclosure is for the purpose of illustration only and that the present invention includes all modifications and equivalents falling within the scope of the appended claim.

I claim:

A meter housing comprising a box having top, bottom and side walls and an open front and a depending flange at the top of the front, the cover seating flatwise against the front and having sliding movement upwardly along the front to bring the upper edge of the cover under said flange, means at the bottom of the box and cover which interengage in response to said upward movement to prevent the cover from swinging forwardly about said flange, and latching means for preventing the cover from sliding downwardly, said latching means comprising a part on the cover disposed above a coacting part on a side wall of the box when in latching position, said coacting parts automatically moving into and being held in locked engagement against vertical movement as said cover slides upwardly.

References Cited in the file of this patent

UNITED STATES PATENTS

| | | |
|---|---|---|
| 1,764,241 | Borzin | June 17, 1930 |
| 1,953,037 | Ash | Mar. 27, 1934 |
| 2,246,347 | Catherwood | June 17, 1941 |
| 2,695,923 | Lajeunesse et al. | Nov. 30, 1954 |
| 2,742,173 | Janson | Apr. 17, 1956 |
| 2,870,238 | Davis | Jan. 20, 1959 |